TORQUE GENERATING DEVICE
Filed Dec. 30, 1966 Sheet 1 of 2
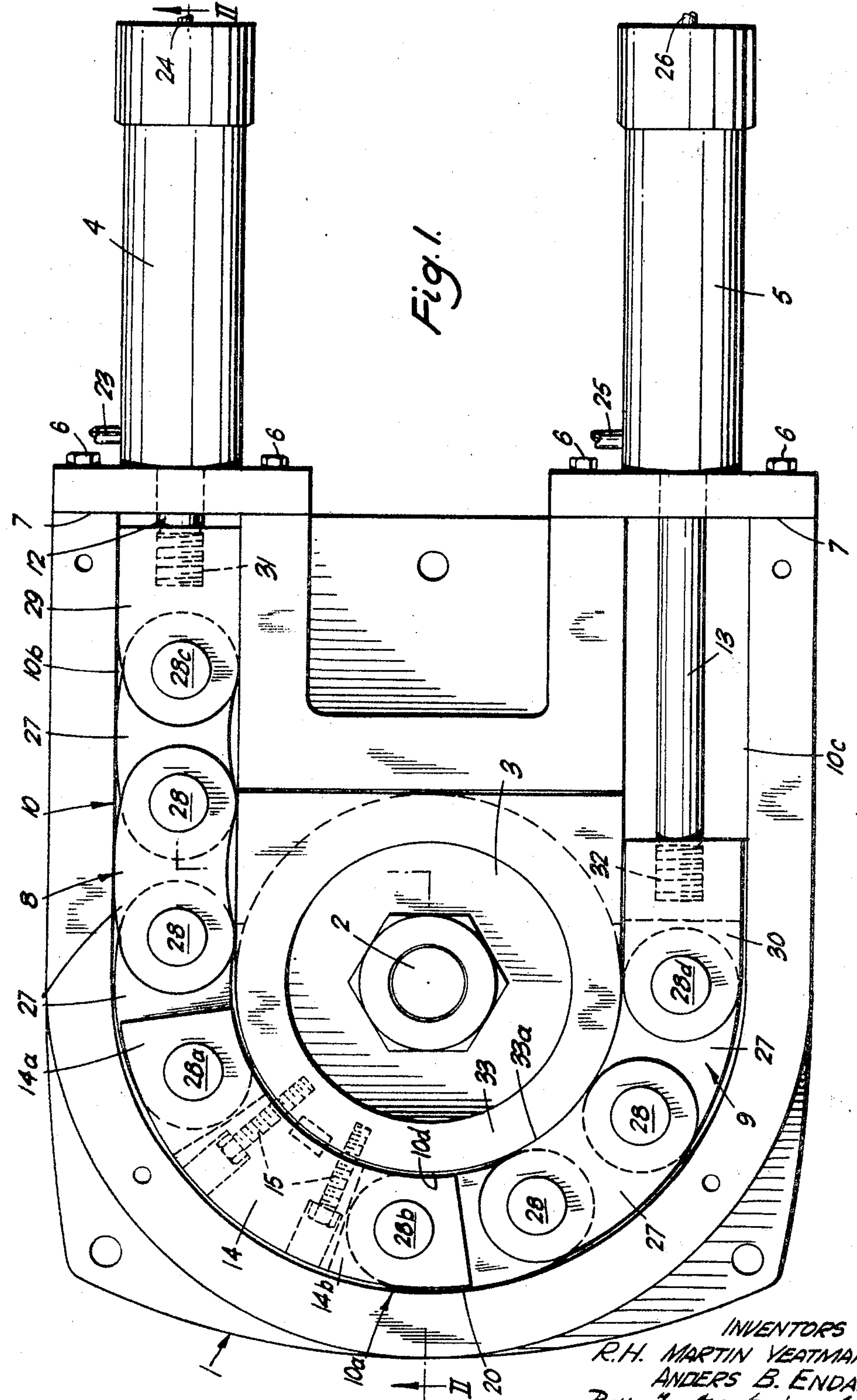

TORQUE GENERATING DEVICE
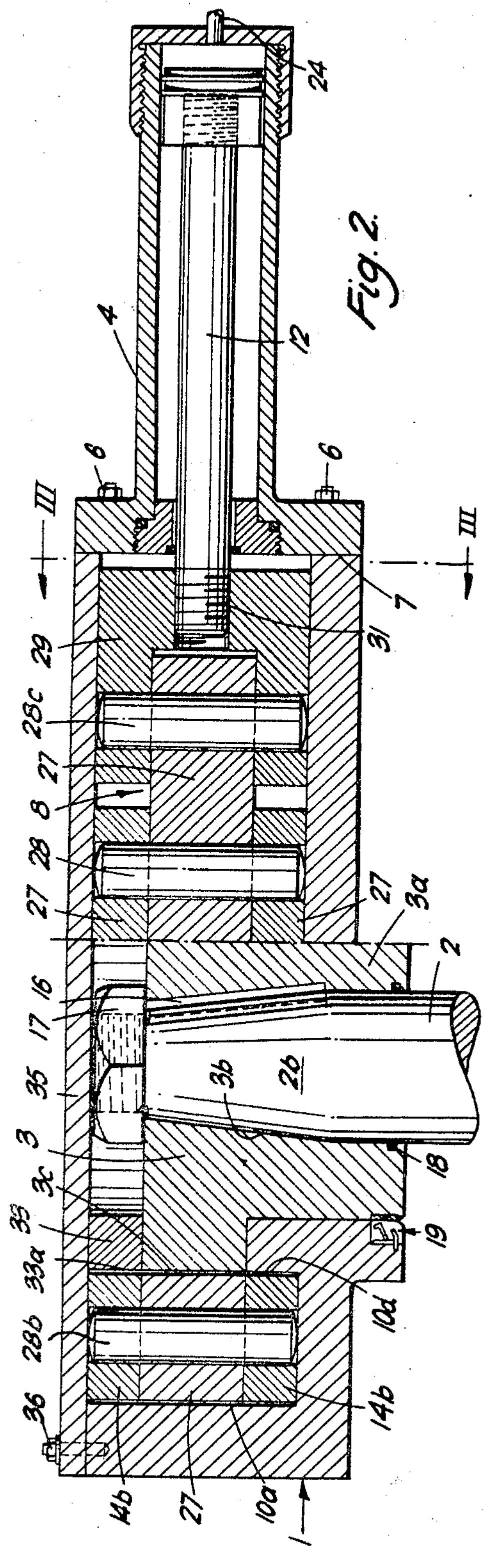
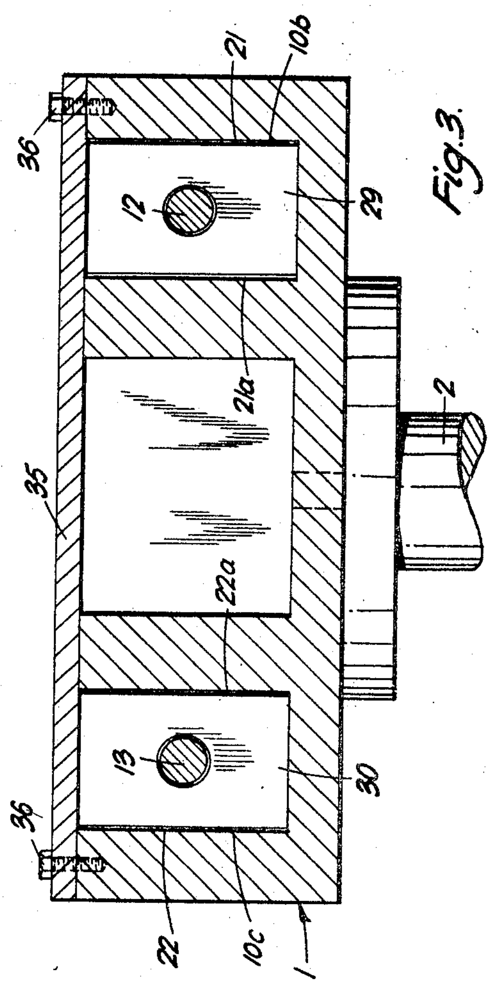
INVENTORS
R.H. MARTIN YEATMAN &
ANDERS B. ENDALL
By: Fetherstonhaugh & Co
ATTORNEYS 3,448,626
TORQUE GENERATING DEVICE

Richard H. M. Yeatman, Lister Drive, P.O. Box 661, Bedford, Nova Scotia, Canada, and Anders B. Endal, Montague, Prince Edward Island, Canada Filed Dec. 30, 1966, Ser. No. 606,434
Int. Cl. F16h 21/44
U.S. Cl. 74—108 18 Claims

ABSTRACT OF THE DISCLOSURE

A hydraulic ram is directly connected to a housing and has its piston connected to a plurality of incompressible links which are constrained in a desired arc of movement. The other end of the link assembly is connected to a torque transmitting member which is directly connected to the pivotable member to be moved through a given arc. Two ram and link assemblies are connected to the torque transmitting member.

This invention relates to torque generating devices for turning and angularly positioning pivotal members which are subject to load, such as for example pivotal derricks, cranes or jibs, gates and articulated earth-remover steering gear and in particular to a device for the pivoting and angular positioning of ship's rudders. It is to be appreciated, however, that the invention is equally applicable to any application requiring the turning and angular positioning of a pivotal member under load.

One well known form of steering mechanism for a ship's rudder comprises a tiller fixedly attached to and projecting radially on opposite sides of the rudder stock, and a pair of single acting hydraulic rams connected by their rods to the tiller on opposite sides of the rudder stock, and pivoted at their head ends. The tiller and hence the rudder is turned in one or other direction by supplying liquid to one cylinder and exhausting the other or vice versa. However this form of steering mechanism suffers from the disadvantage that when the rudder moves further away from its central or straight ahead position, the force required to be developed by the cylinders for a constant applied torque increases. This effect is compounded by the fact that the maximum torque imposed on the rudder by the water is experienced at maximum rudder angle.

It is consequently a principal object of the present invention to provide a steering device for a ship's rudder utilizing hydraulic ram means, in which the force required to be developed by the ram bears a constant ratio to the torque imposed on the rudder by the water throughout the entire range of angular displacement of the rudder. Another object of the invention is to provide a hydraulic ram operated torque generating device for turning and angularly positioning a pivotal member subject to load, wherein the linear travel of a ram is directly proportional to the angular displacement of the pivotal member.

Still another object of the invention is to provide a ram operated torque generating device for the purpose described which can operate at pressures above 1000 p.s.i.g., and which is well suited to the employment of double acting rams. The use of double-acting rams permits of a compact structure which is advantageous especially in ships where space is an important consideration.

Still another object of the invention is to provide a ram operated steering gear for a ship's rudder which is of an inherently self-lubricating enclosed design requiring the minimum of seals and gaskets.

Yet another object of the invention is to provide a ram operated steering gear for a ship's rudder which obviates the need for a separate thrust or lateral bearing at the top end of the rudder stock.

Yet another object of the invention is to provide a ram operated steering gear for a ship's rudder which is simple to construct and maintain and requires the minimum of close tolerance fits.

Yet another object of the invention is to provide a ram operated steering gear for a ship's rudder which is capable of tolerating severe upsetting of the rudder stock if the vessel grounds, and which has good resistance to distortion of surrounding ships structure.

Yet another object of the invention is to provide a cheap, efficient, and reliable torque generating device for the purpose described.

Yet another object of the invention is to provide a hydraulic ram operated torque generating device for turning and angularly positioning a pivotal member subject to load, comprising a torque transmitting member, turnable about an axis, for transmitting turning movements to the pivotal member, a laterally flexible connector, capable of transmitting longitudinal compressive and tensile forces, connected between the torque transmitting member and the ram, and a guide track for laterally constraining the connector whilst permitting longitudinal sliding thereof, said guide track having a curved portion following an arc of a circle centered on the axis of rotation of the torque transmitting member.

Other advantages and objects of the invention will become apparent by reference to the ensuing description when read in conjunction with the accompanying drawings, which description and drawings are set forth purely by way of an example of the invention, and are not intended to limit the spirit or scope of the invention for which reference should be made to the appended claims.

In the drawings:

FIGURE 1 is a plan view, with top cover plate removed, of a steering mechanism for a ship's rudder according to one embodiment of the invention, FIGURE 2 is a sectional view along line II—II of FIGURE 1, and FIGURE 3 is a sectional view along line III—III of FIGURE 2.

The steering mechanism comprises generally a cast iron housing 1, which in operation is attached near the stern of a ship, to operate a rudder (not shown) through a rudder stock 2, a circular plate shaped tiller 3, journalled in housing 1, by a boss section 3*a*, of the tiller 3, a pair of double-acting hydraulic rams 4 and 5 attached by bolts 6 to end wall 7 of the housing, the axes or paths of action of the rams being parallel and spaced apart and normal to the axis of the rudder stock and a pair of connectors shown generally at 8 and 9, situated in a guide track 10, attaching the piston rods 12 and 13 of the respective rams to the tiller 3 through a quadrant plate 14 secured by screws 15 to the periphery of the tiller 3 or forged integrally with the tiller 3 as production economics may show preferable.

The rudder stock 2 has a tapered end portion 2*b* which mates with a tapered hole 3*b* in the tiller 3. A sliding key 16 or hydraulic shrink-fit sleeve connects the rudder stock 2 to the tiller 3, for rotation therewith and a lock nut 17 screwed onto the top of the rudder stock 2 secures the latter to the tiller 3. A seal 18 is provided to prevent dirt entering the interface between the rudder stock 2 and the tiller 3, and a seal 19 is provided between the housing 1 and the tiller boss 3*a* to retain lubricant in the mechanism.

The guide track 10 has a semicircular portion 10*a* and a pair of linear end portions 10*b* and 10*c*, one at either end of the semicircular portion 10*a*. The semicircular portion 10*a* is defined between the periphery 3*c* of the tiller 3, inner semicircular wall 10*d* of the housing 1 and the outer surface 33*a* of fairing plate 33 on one side, and outer semicircular wall 20 of the housing 1 on the other side. The linear end portions 10*b* and 10*c* are formed as grooves in the housing 1 and, as more clearly shown in FIGURE 3, defined by walls 21, 21*a*, 22, 22*a* respectively. These linear portions 10*b* and 10*c* lead to and are aligned with the rams 4 and 5, so that when the rams 4 and 5 are actuated through hydraulic lines 23, 24, 25 and 26, the piston rods 12 and 13 of the rams 4 and 5 may slide into and out of the linear portions 10*b* and 10*c*.

The connectors 8 and 9 are each made of a plurality of kidney-shaped links 27 pivotally interconnected by pins 28, the first link of each connector being pivoted through pin 28*a* (or 28*b*) to the bifurcated end portion 14*a* (or 14*b*) of quadrant 14, and the last link of each connector being pivoted through pin 28*c* (or 28*d*) to the bifurcated end of a sliding cleavis 29 (or 30) screwed at 31 (or 32) onto the end of one of the piston rods 12 (or 13).

By this arrangement of pivotally interconnected kidney-shaped links, a pair of longitudinally inextensible and incompressible connectors are formed, linking each piston rod with one side of the quadrant plate, and the connectors are constrained laterally by the side walls of the guide track, the connectors having a sliding fit therein. The linear portions of the guide track should be slightly wider than the semicircular portion, to accommodate the curved backs of the links, the outer walls of the track being relieved fractionally to this end.

A cover plate 35 attached to the housing by screws 36 prevents upward movements of the links, pins, or fairing plate, and also serves to retain lubricant in the system.

It will be obvious from the above description that, in operation, the rams 4 and 5 on actuation thereof will act through the connectors 8 and 9 and quadrant plate 14 to transmit torque to the rudder stock 2, thereby turning the rudder and steering the ship. It will be appreciated that since the connectors 8 and 9 are longitudinally incompressible and inextensible whilst being laterally constrained to follow a pattern having a portion curved in an arc of a circle about the rudder axis, both double acting rams 4 and 5 contribute to the force required to turn the rudder, one "pushing" the tiller 3 through its associated connector 8 or 9 whilst the other "pulls." Further the force required to be developed by the rams 4 and 5 remains at a constant ratio to the torque imposed on the rudder by the water throughout their stroke, and the movement of the rudder is proportional to the movement of the ram pistons 12 and 13.

The mechanism above described is therefore well calculated to fulfill the objects of the invention but it will be appreciated to those skilled in the art that numerous modifications can be made in the described illustrative embodiment without departing from the spirit of the invention, the scope of which is defined in the appended claims.

What we claim as our invention:

1. A hydraulic ram operated torque generating device for turning and angularly positioning a pivotal member subject to load comprising: a torque transmitting member pivotable about an axis for turning the pivotal member, a longitudinally inextensible and incompressible laterally flexible connector attaching the torque transmitting member to the ram, and a guide track for said connector curved in an arc of a circle centered on said axis and constraining said connector laterally whilst permitting longitudinal movements thereof to transmit motion from the ram to the torque transmitting member, said torque transmitting member extending into said guide track and disposed directly in the line of movement of said connector.

2. A torque generating device for turning and angularly positioning a pivotal member subject to load comprising: a housing, a hydraulic ram having a fixed part attached to said housing and a movable pin, a torque transmitting member for imparting motion to the pivotal member and turnably mounted in said housing about an axis normal to the path of action of the ram, a guide track leading from said torque transmitting member to said ram, said guide track having a portion curved in an arc of a circle centered on said axis, a laterally deformable connector capable of transmitting longitudinal forces in said guide track attaching said torque transmitting member to said movable part of said ram, whereby movements of said movable part are transmitted to said torque transmitting member through said connector, said connector sliding longitudinally along said guide track and being constrained laterally thereby.

3. A torque generating device for turning and angularly positioning a pivotal member subject to load comprising: a housing, a first hydraulic ram having a fixed member attached to said housing and a movable member slidable relative to said fixed member, a second hydraulic ram having a fixed member attached to said housing in parallel relation to the fixed member of said first ram, and a movable member slidable relative to the fixed member, a torque transmitting member for imparting motion to the pivotal member and turnably mounted in said housing about an axis normal to the paths of action of said rams and midway therebetween, a first guide track leading from said torque transmitting member to said first ram and having a portion curved in an arc of a circle centered on said axis, a second guide track leading from said torque transmitting member to said second ram and having a portion curved in an arc of a circle centered on said axis, a first longitudinally inextensible and incompressible laterally deformable connector in said first guide track attaching said torque transmitting member to said moving part of said first ram, and a second longitudinally inextensible and incompressible connector in said second guide track connecting said torque transmitting member to said moving member of said second ram whereby movements of said movable members are transmitted to said torque transmitting members through said connectors which can slide longitudinally in said tracks whilst being constrained laterally thereby.

4. A torque generating device for turning and angularly positioning a pivotal member subject to resistance comprising a housing, a first hydraulic ram having a fixed part attached to said housing and a movable part slidable relative to said fixed part, a second hydraulic ram having a fixed part attached to said housing and a movable part slidable relative to said fixed part, said rams having parallel paths of action, a torque transmitting member for imparting motion to said pivotal member, and mounted in said housing for turning about an axis normal to and midway between the paths of action of said rams, a guide track, said guide track having a semicircular portion centered on said axis, and a pair of linear end portions aligned one with each of said rams and leading one from each end of said semicircular portion to one of the rams respectively, and a pair of longitudinally inextensible and incompressible laterally deformable connectors in said guide track, one connector attaching the movable part of said first ram to said torque transmitting member and the other connector attaching the movable part of said second ram to said torque transmitting member whereby movements of said movable members are transmitted to said torque transmitting member through said connectors which are permitted longitudinal movement along said guide track whilst being laterally constrained thereby.

5. The torque generating device of claim 4 wherein said torque transmitting member is a circular plate journalled for rotation in said housing.

6. The torque generating device of claim 5 wherein said plate has an attachment part projecting from the periphery thereof, said connectors being attached to said attachment part.

7. The torque generating device of claim 6 wherein said guide track is formed in part on said plate and in part in said housing.

8. The torque generating device of claim 4 in which the connectors each comprise a plurality of interconnected kidney-shaped links.

9. The torque generating device of claim 8 in which the connectors are each attached to their respective rams through a cleavis slidable in said guide track and threaded onto the moving part of the respective ram.

10. In a ship's rudder steering mechanism in combination: a housing, a hydraulic ram having a fixed part attached to said housing and a moving part slidable relative to said fixed part, a tiller for imparting turning movements to the rudder, the tiller being turnably mounted in said housing about an axis normal to the path of action of said ram, a guide track leading from said tiller to said ram and having a portion curved in an arc of a circle centered on said axis, and a longitudinally inextensible and incompressible laterally deformable connector in said guide track attaching said tiller to said movable part of said ram whereby movements of said movable part are transmitted to said tiller through said connector which is permitted longitudinal sliding in said guide track whilst being laterally constrained thereby.

11. In a ship's rudder steering mechanism in combination: a housing, a first hydraulic ram having a fixed part attached to said housing and a movable part slidable relative to said fixed part, a second hydraulic ram having a fixed part attached to said housing a movable part slidable relative to said fixed part, said rams having parallel paths of action, a tiller for imparting turning movements to the rudder and mounted for turning in said housing about an axis normal to said paths of action and mid-way therebetween, a guide track leading from said tiller to each of said rams, said guide track having a semicircular portion centered on said axis and a pair of linear end portions aligned one with each of said rams and leading one from each end of the semicircular portion to one of the rams respectively, and a pair of longitudinally inextensible and incompressible laterally deformable connectors in said guide tracks one connector attaching the movable part of said first ram to said tiller and the other connector attaching the movable part of said second ram to said tiller whereby movements of said movable members are transmitted to said tiller through said connectors which are permitted longitudinal movement along said guide track whilst being constrained laterally thereby.

12. The steering mechanism of claim 11 in which the tiller is a circular plate journalled for rotation in the housing.

13. The steering mechanism of claim 12 in which said plate has an attachment part projecting from the periphery thereof, said connectors being attached to said attachment part.

14. The steering mechanism of claim 13 in which said guide track is formed in part on said plate and in part in said housing.

15. The steering mechanism of claim 11 in which the connectors, each comprise a formality of interconnected kidney-shaped links.

16. The steering device of claim 15 in which the connectors are each attached to their respective rams through a cleavis slidable in said guide track and threaded onto the movable part of the respective ram.

17. A steering device for a ship's rudder comprising: a housing, a first double acting hydraulic ram having its cylinder attached to the housing, a second double acting hydraulic ram having its cylinder attached to the housing, the pistons of said rams having parallel paths of action, means for supplying hydraulic fluid to and exhausting hydraulic fluid from each side of the pistons of the respective rams, a circular plate-shaped tiller for turning the rudder and journalled for rotation in the housing about an axis normal to and midway between the paths of action of said rams, a quadrant-shaped attachment member on the periphery of the tiller, a guide track having a semicircular portion surrounding said tiller and a pair of linear end portions leading one from each end of said semicircular portions to one of the rams respectively, said guide track being formed in part in said housing and in part on said tiller, a pair of connectors in said guide track, each connector comprising a plurality of interconnected kidney-shaped links, one connector attaching said attachment member to the piston of said first ram and the other connector attaching said attachment member to the piston of said second ram, whereby movements of said pistons are transmitted to said tiller through said connectors and said attachment member, said connectors sliding longitudinally along said guide track whilst being constrained laterally thereby.

18. A torque generating device for turning and angularly positioning a pivotal member subject to load comprising: a housing, a double acting hydraulic ram having its cylinder attached to said housing and its piston slidable with respect to said housing, a torque transmitting member for turning the pivotal member and mounted in said housing for turning about an axis normal to the path of action of the ram, and a connector comprising a plurality of interconnected substantially inextensible and incompressible kidney-shaped links attaching said torque transmitting member to the ram piston and guided in a path having a portion curved in an arc of a circle centered on said axis, whereby actuation of said ram effects turning of the torque transmitting member through said connector, said torque transmitting member being disposed in said path of movement of said kidney-shaped links.

References Cited

UNITED STATES PATENTS

| | | | |
|---|---|---|---|
| 2,841,998 | 7/1958 | Troche | 74—108 |
| 3,267,816 | 8/1966 | Graham | 91—186 |
| 3,267,817 | 8/1966 | Adams | 91—186 |

FRED C. MATTERN, Jr., *Primary Examiner.*

F. D. SHOEMAKER, *Assistant Examiner.*

U.S. Cl. X.R.

91—186; 92—137; 114—150